US012694333B2

(12) United States Patent
Yokoyama et al.

(10) Patent No.:     US 12,694,333 B2
(45) Date of Patent:       Jul. 28, 2026

(54) MODEL LEARNING SYSTEM AND MODEL LEARNING DEVICE

(71) Applicant: TOYOTA JIDOSHA KABUSHIKI KAISHA, Toyota (JP)

(72) Inventors: Daiki Yokoyama, Gotemba (JP); Tomohiro Kaneko, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 940 days.

(21) Appl. No.: 17/978,511

(22) Filed: Nov. 1, 2022

(65) Prior Publication Data

US 2023/0145386 A1     May 11, 2023

(30) Foreign Application Priority Data

Nov. 10, 2021     (JP) ................................. 2021-183648

(51) Int. Cl.
*G06N 3/08*          (2023.01)
*G06N 20/00*        (2019.01)

(52) U.S. Cl.
CPC .............. *G06N 20/00* (2019.01); *G06N 3/08* (2013.01)

(58) Field of Classification Search
CPC .......... G06N 20/00; G06N 3/084; G06N 3/08; G06N 3/09; G06N 3/0464
See application file for complete search history.

(56) References Cited

U.S. PATENT DOCUMENTS

| | | | | |
|---|---|---|---|---|
| 10,789,548 | B1 * | 9/2020 | Yeganeh ................ | G06N 20/00 |
| 11,048,979 | B1 * | 6/2021 | Zhdanov ............ | G06F 18/2155 |
| 11,205,138 | B2 * | 12/2021 | Shaikh ..................... | G06N 5/02 |
| 2017/0323216 | A1 * | 11/2017 | Fano ...................... | G06N 20/00 |
| 2020/0132011 | A1 | 4/2020 | Kitagawa et al. | |
| 2020/0134374 | A1 | 4/2020 | Oros | |
| 2021/0192872 | A1 | 6/2021 | Morita et al. | |
| 2021/0365813 | A1 * | 11/2021 | Nakano .................. | G06N 20/00 |
| 2022/0215272 | A1 * | 7/2022 | Yokota ................. | G06N 3/0464 |
| 2023/0028196 | A1 * | 1/2023 | Keefe .................. | G06V 10/454 |
| 2023/0039523 | A1 * | 2/2023 | Kono ...................... | G05B 17/02 |
| 2023/0391357 | A1 * | 12/2023 | Yang ...................... | G06F 16/58 |

FOREIGN PATENT DOCUMENTS

| | | |
|---|---|---|
| CN | 111102043 A | 5/2020 |
| CN | 113008569 A | 6/2021 |
| CN | 113011828 A | 6/2021 |
| JP | 2013-069084 A | 4/2013 |

* cited by examiner

*Primary Examiner* — Beau D Spratt
(74) *Attorney, Agent, or Firm* — Dinsmore & Shohl LLP

(57)          ABSTRACT

A model learning system includes a device in which a learning model is used, a data acquisition device that acquires data used for creating a training data set for the learning model, and a model learning device that automatically learns the learning model using the training data set for the learning model created using the data. The model learning device is configured to, when a model accuracy after automatically learning the learning model decreases or does not increase compared to before learning, exclude the learning model from a target to be automatically learned.

6 Claims, 6 Drawing Sheets

FIG. 1

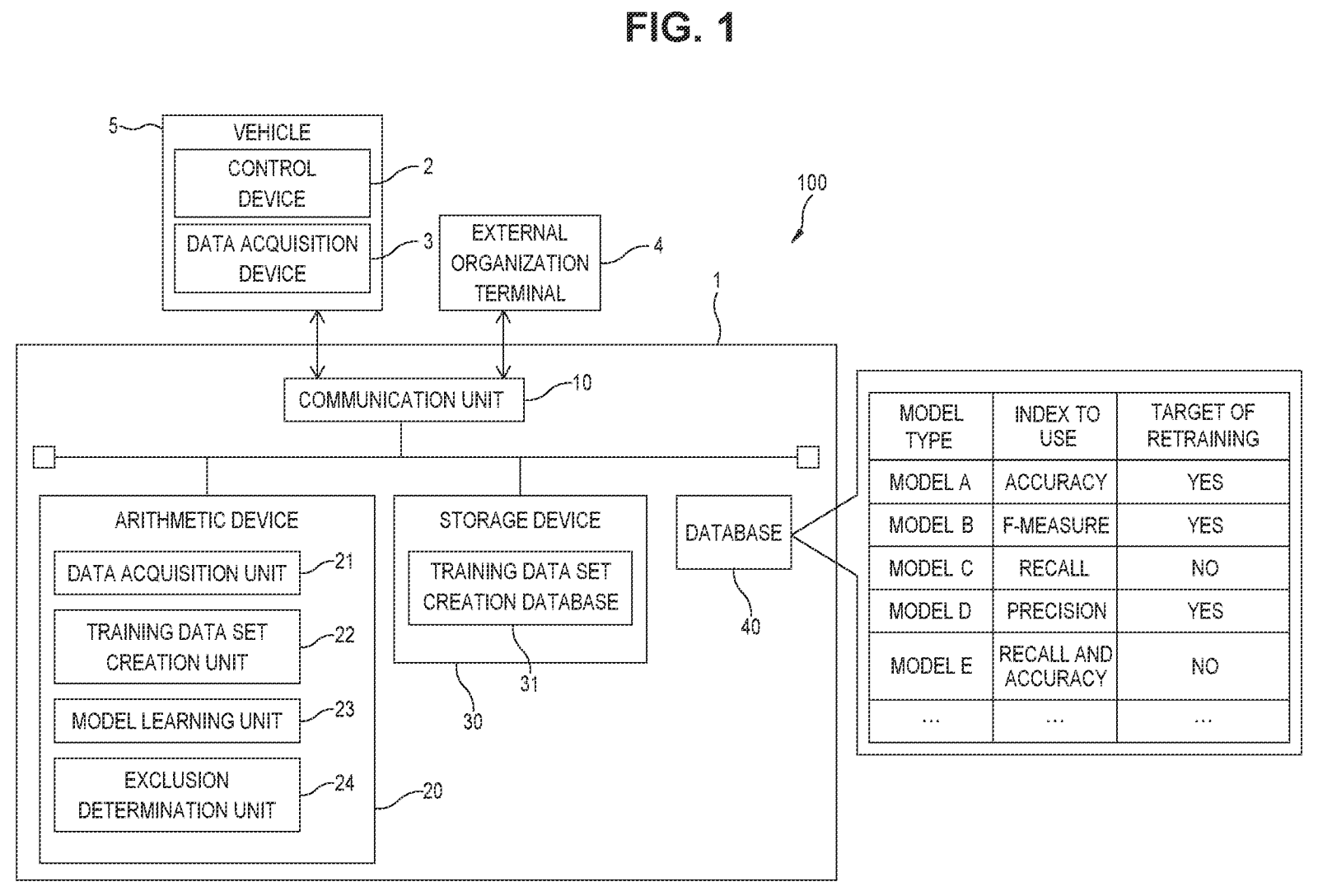

| MODEL TYPE | INDEX TO USE | TARGET OF RETRAINING |
|---|---|---|
| MODEL A | ACCURACY | YES |
| MODEL B | F-MEASURE | YES |
| MODEL C | RECALL | NO |
| MODEL D | PRECISION | YES |
| MODEL E | RECALL AND ACCURACY | NO |
| ... | ... | ... |

INTERNET

SMART CITY CONTROL DEVICE 2

SMART CITY
(CONNECTED CITY)

DATA ACQUISITION — 3
DEVICE

MODEL LEARNING SYSTEM AND MODEL LEARNING DEVICE

CROSS-REFERENCE TO RELATED APPLICATION

This application claims priority to Japanese Patent Application No. 2021-183648 filed on Nov. 10, 2021, incorporated herein by reference in its entirety.

BACKGROUND OF THE DISCLOSURE

1. Field of the Disclosure

The present disclosure relates to a model learning system and a model learning device.

2. Description of Related Art

Japanese Unexamined Patent Application Publication No. 2013-69084 discloses collecting data from within a smart city.

SUMMARY OF THE DISCLOSURE

In the future, it is expected that learning models (artificial intelligence models) that carry out learning such as machine learning will be used in various sectors of society, and further, in order to improve an accuracy of a learning model, it is assumed that the learning model is automatically re-learned as necessary based on, for example, data collected in a smart city. However, even when the learning model is re-learned, it is conceivable that the accuracy of the learning model does not improve or even decreases. When the re-learning is automatically repeated even though the accuracy of the learning model is not improved, limited arithmetic resources are wasted.

The present disclosure suppresses unnecessary re-learning of a learning model.

A model learning system according to a first aspect of the present disclosure includes a device in which a learning model is used, a data acquisition device configured to acquire data for creating a training data set for the learning model, and a model learning device configured to automatically learn the learning model using the training data set for the learning model created using the data. The model learning device is configured to, when a model accuracy after automatically learning the learning model decreases or does not increase compared to before learning, exclude the learning model from a target to be automatically learned.

A model learning device according to a second aspect of the present disclosure automatically learns a learning model using a training data set and is configured to, when a model accuracy after automatically learning the learning model decreases or does not increase compared to before learning, exclude the learning model from a target to be automatically learned.

With each aspect of the present disclosure, it is possible to prevent the re-learning from being automatically repeated even though the accuracy of the learning model is not improved. Therefore, it is possible to prevent unnecessary re-learning of the learning model.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram of a model learning system according to an embodiment of the present disclosure;

DETAILED DESCRIPTION OF EMBODIMENTS

Figure 2:
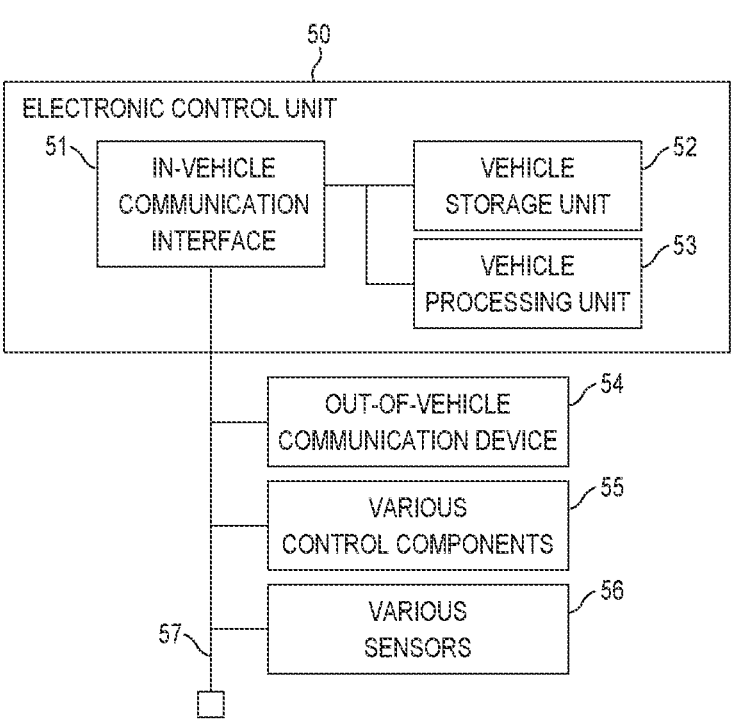
FIG. 2 is a diagram illustrating a hardware configuration of a vehicle according to the embodiment of the present disclosure.

Hereinafter, an embodiment of the present disclosure will be described in detail with reference to the drawings. In the following description, similar components are given the same reference numerals.

FIG. 1 is a schematic configuration diagram of a model learning system 100 according to an embodiment of the present disclosure.

The model learning system 100 includes a server 1 as a model learning device, a control device 2, a data acquisition device 3, and an external terminal (hereinafter referred to as "an external organization terminal 4") belonging to an external organization.

The server 1 includes a communication unit 10, an arithmetic device 20, a storage device 30, and a database 40.

The communication unit 10 is a communication interface circuit for connecting the server 1 to each of the control device 2, the data acquisition device 3, and the external organization terminal 4 via a network such that the server 1 can communicate with each of them. In the present embodiment, as illustrated in FIG. 1, for the purpose of explaining an example in which the control device 2 and the data acquisition device 3 are mounted on a vehicle 5, communication between the server 1 and the control device 2 and the data acquisition device 3 is performed via an out-of-vehicle communication device 54 (see FIG. 2) mounted on the vehicle 5.

The arithmetic device 20 is a device for executing various programs stored in the storage device 30 and comprehensively controlling the overall operation of the server 1, and is, for example, a processor. The arithmetic device 20 functions as a data acquisition unit 21, a training data set creation unit 22, a model learning unit 23, and an exclusion determination unit 24 by executing processing according to a program, and operates as a functional unit (module) that realizes a predetermined function. In the following description, when the process is explained with each functional unit as the subject, it is shown that the arithmetic device 20 is executing the program that realizes the functional unit. Details of each of the functional units 21 to 24 will be described below.

The storage device 30 is a device for storing a program executed by the arithmetic device 20 and data used when executing the program, and is, for example, a memory, a hard disk drive (HDD), a solid state drive (SSD), a random access memory (RAM), a read only memory (ROM), or the like. The details of the data stored in a training data set creation database 31 of the storage device 30 will be described below.

The database 40 includes types of models, an index of accuracy that is used to measure the accuracy of corresponding model, and information on whether corresponding model is subject to automatic retraining or not. The index of accuracy may include, but not limited to, at least one of an accuracy index, a precision index, a recall index, or an F-measure index, which are common indicators for measuring accuracy of a machine learning model. For example, by referring to FIG. 1, the accuracy of Model A may be calculated based on the accuracy index and Model A is currently subject to automatic retraining. The accuracy of Model C may be calculated based on the recall index and Model C is not currently subject to automatic retraining. A unique index may be used without being limited to these indices.

The external organization terminal 4 is a computer provided on the external organization side and operated by a person belonging to the external organization, having a keyboard, a display, and the like, and is configured to be able to communicate with the server 1 via a network. The external organization is, for example, an external specialized organization to which a human expert (for example, a data scientist) who analyzes a learning model or the like belongs.

The control device 2 is a device that uses a learning model (artificial intelligence model) in which learning such as machine learning is performed to perform controlling. The control device 2 is, for example, various control components mounted on the vehicle 5. However, the control device 2 is not limited to this, and may be mounted on an electric appliance such as a home electric appliance, a wearable device or an electric device which is used in a smart city unrelated to the vehicle 5.

The data acquisition device 3 is a device for acquiring data necessary for creating a training data set used when learning (re-learning) a learning model. The data acquisition device 3 is, for example, various sensors mounted on the vehicle 5 and used for controlling the vehicle 5. However, the data acquisition device 3 is not limited to this, and may be various sensors provided in various places in the smart city to collect information in the smart city.

Figure 5:
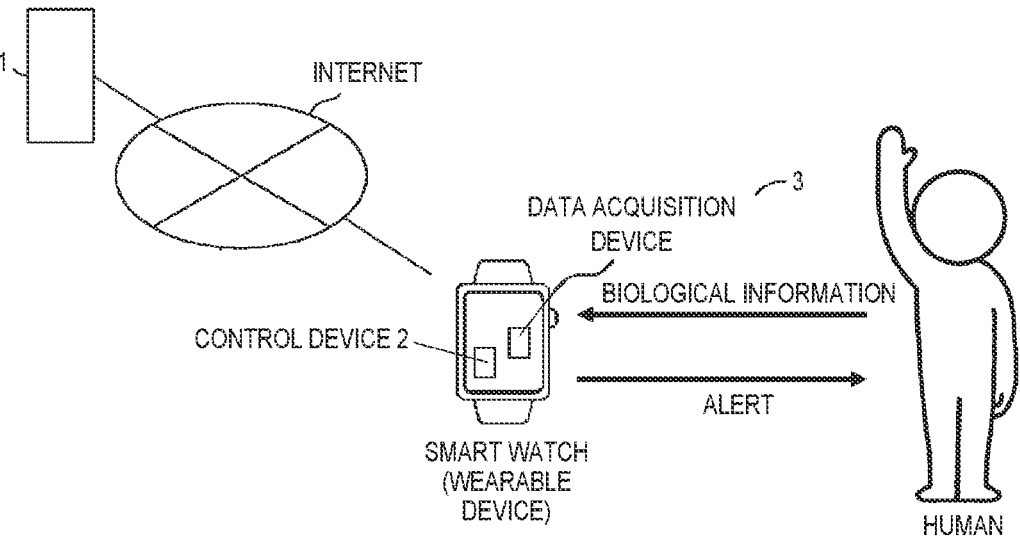
FIG. 5 depicts another example for a model learning system according to an embodiment of the present disclosure.
Figure 6:
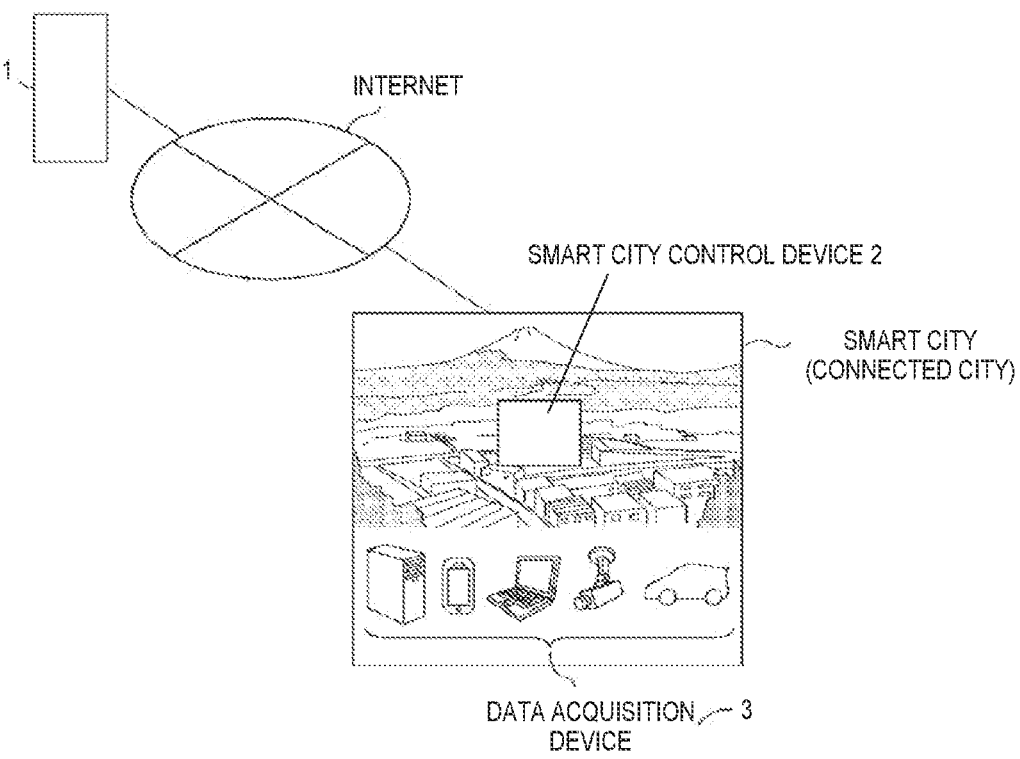
FIG. 6 depicts other example for a model learning system according to an embodiment of the present disclosure.

FIG. 5 depicts an example of a model learning system which includes a wearable device. The wearable device includes a data acquisition device 3 which may obtain biological information or information about user's situation. The biological information may include heartbeat, blood pressure, blood oxygen level or body temperature. The information about user's situation may include a speed of walking or a momentum of the user. The examples of the wearable device may include, but not limited to, a smart watch, a smart ring, smart glasses or a smart phone. The wearable device includes a control device 2 in which learning such as machine learning is performed to perform controlling the wearable device. The control device 2 may control the wearable device to alert the user's anomaly to the user based on the result of the machine learning model, or report the user's anomaly to a hospital or a police. Examples of the user's anomaly may include an arrhythmia, a stroke or a heat stroke. FIG. 6 depicts an example of a model learning system which may be used in a smart city. The smart city includes a smart city control device 2 in which learning such as machine learning is performed to perform controlling and data acquisition devices 3. The smart city control device 2 is mounted in a computer. The computer may be in the smart city, or in outside of smart city. The data acquisition devices 3 are devices which are in the smart city. The data acquisition device 3 includes a personal server, a smart phone, a personal laptop, a surveillance camera, a thermometer, a hygrometer, wearable devices which a person in the smart city wears, or a vehicle. The smart city control device 2 may control various devices not only inside of the smart city but also outside of the smart city. For example, based on prediction of garbage outputs in smart city calculated by the machine learning model, the smart city control device 2 requests a company which manages garbage trucks to send a specific number of garbage trucks to the smart city. Other example, based on prediction of the amount of electricity use in smart city, the smart city control device 2 adjusts a power storage amount in the smart city. Other example, based on prediction of traffic volume in the smart city, the smart city control device 2 controls traffic lights or vehicles in the smart city to prevent traffic congestion.

As described above, in the present embodiment, for the sake of explanation where an example in which the control device 2 and the data acquisition device 3 are mounted on the vehicle 5 is described, communication between the server 1 and the control device 2 and the data acquisition device 3 is performed via the out-of-vehicle communication device 54 (see FIG. 2) mounted on the vehicle 5. A wireless communication function may be provided in each of the control device 2 and the data acquisition device 3 so as to be able to communicate with the server 1.

The vehicle 5 is not particularly limited in its type, and may be a vehicle equipped with only an internal combustion engine as a power source. In addition, the vehicle 5 may be an electric vehicle equipped with a traveling electric motor such as a battery electric vehicle, a hybrid electric vehicle, a plug-in hybrid electric vehicle, and a fuel cell electric vehicle. Further, the vehicle 5 may be a manually operated vehicle or an automatically operated vehicle.

FIG. 2 is a diagram illustrating a hardware configuration of the vehicle 5 according to the present embodiment.

The vehicle 5 according to the present embodiment is a hybrid vehicle, and includes an electronic control unit 50, the out-of-vehicle communication device 54, various control components 55 mounted on the vehicle 5 such as an internal combustion engine, a traveling electric motor, and an air conditioner, and various sensors 56 required to control various control components 55 and to detect measured values of input parameters and output parameters of various learning models used as needed to control various control components 55. The electronic control unit 50, the out-of-vehicle communication device 54, and various control components 55 and sensors 56 are connected to each other via an in-vehicle network 57 conforming to a standard such as controller area network (CAN).

The electronic control unit 50 includes an in-vehicle communication interface 51, a vehicle storage unit 52, and a vehicle processing unit 53. The in-vehicle communication interface 51, the vehicle storage unit 52, and the vehicle processing unit 53 are connected to each other via a signal line.

The in-vehicle communication interface 51 is a communication interface circuit for connecting the electronic control unit 50 to the in-vehicle network 57 conforming to a standard such as controller area network (CAN).

The vehicle storage unit 52 has a storage medium such as a hard disk drive (HDD), an optical recording medium, and a semiconductor memory, and stores various computer programs, data, and the like used for processing in the vehicle processing unit 53.

The vehicle processing unit 53 includes one or a plurality of central processing units (CPUs) and peripheral circuits thereof. The vehicle processing unit 53 executes various computer programs stored in the vehicle storage unit 52 and collectively controls various control components 55 mounted on the vehicle 5, and is, for example, a processor.

The out-of-vehicle communication device 54 is an in-vehicle terminal having a wireless communication function. Communication is mutually performed with respect to the vehicle 5, and further, between the control components 55 and the sensors 56 mounted on the vehicle 5, and the server 1 via the out-of-vehicle communication device 54.

In the vehicle 5, a learning model is used as needed in controlling various control components 55 mounted on the vehicle 5 by the electronic control unit 50. In the present embodiment, as a learning model, a neural network model (hereinafter referred to as "NN model") using a deep neural network (DNN), a convolutional neural network (CNN), or the like is used in which deep learning is performed. Therefore, the learning model according to the present embodiment can be said to be a learned NN model in which deep learning is performed. Deep learning is one of the representative machine learning methods of artificial intelligence (AI).

Figure 3:
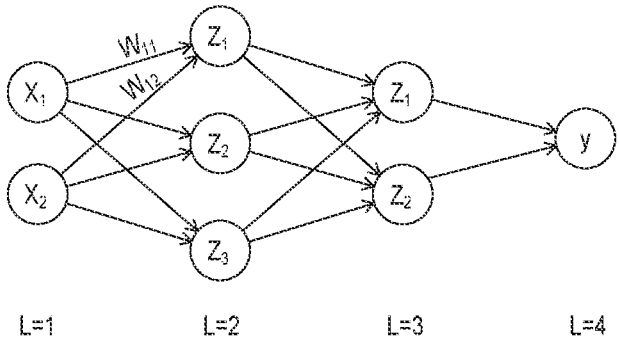
FIG. 3 is a diagram illustrating an example of a learning model according to the embodiment of the present disclosure.

FIG. 3 is a diagram illustrating an example of a learning model (NN model) according to the present embodiment.

The circles in FIG. 3 represent artificial neurons. Artificial neurons are commonly referred to as nodes or units (referred to herein as "nodes"). In FIG. 3, L=1 indicates an input layer, L=2 and L=3 indicate a hidden layer, and L=4 indicates an output layer. The hidden layer is also called a middle layer. Although FIG. 3 illustrates an NN model having two hidden layers, the number of hidden layers is not particularly limited, and the number of nodes in each of the input layer, the hidden layer, and the output layer is not particularly limited.

In FIG. 3, $x_1$ and $x_2$ indicate the nodes of the input layer (L=1) and the output values from the nodes, and y indicates the node of the output layer (L=4) and the output value from the node. Similarly, $z_1^{(L=2)}$, $z_2^{(L=2)}$, and $z_3^{(L=2)}$ indicate nodes of the hidden layer (L=2) and the output values from the nodes, and $z_1^{(L=3)}$ and $z_2^{(L=3)}$ indicate the nodes of the hidden layer (L=3) and the output values from the nodes.

The input is output as it is at each node of the input layer. The output values $x_1$ and $x_2$ of the nodes of the input layer are input to the nodes of the hidden layer (L=2), and at each node of the hidden layer (L=2), a total input value u is calculated using the corresponding weight w and bias b. For example, in FIG. 3, a total input value $u_k^{(L=2)}$ calculated at each node represented by $z_k^{(L=2)}$ (k=1, 2, 3) of the hidden layer (L=2) is as shown in the following equation (M is the number of nodes in the input layer))

$$u_k^{(L=2)} = \sum_{m=1}^{M} \left( x_m \cdot w_{km}^{(L=2)} \right) + b_k$$

<div align="right">Equation 1</div>

Next, this total input value $u_k^{(L=2)}$ is converted by an activation function f, and then it is output as an output value $z_k^{(L=2)}$ (=f $(u_k^{(L=2)})$) from the node represented by $z_k^{(L=2)}$ of the hidden layer (L=2). The output values $z_1^{(L=2)}$, $z_2^{(L=2)}$, and $z_3^{(L=2)}$ of the nodes of the hidden layer (L=2) are input to each node of the hidden layer (L=3), and at each node of the hidden layer (L=3), a total input value u (=Σz·w+b) is calculated using the corresponding weight w and bias b. This total input value u is similarly converted by the activation function, and is output as output values $z_1^{(L=3)}$ and $z_2^{(L=3)}$ from the nodes of the hidden layer (L=3). The activation function is, for example, a sigmoid function σ.

Further, the output values $z_1^{(L=3)}$ and $z_2^{(L=3)}$ of the nodes of the hidden layer (L=3) are input to the node of the output layer (L=4), and at the node of the output layer, a total input value u (Σz·w+b) is calculated using the corresponding weight w and bias b, or a total input value u (Σz·w) is calculated using only the corresponding weight w. For example, the node of the output layer uses an identity function as the activation function. In this case, the total input value u calculated in the node of the output layer is output as it is from the node of the output layer as the output value y.

As described above, the learning model according to the present embodiment includes the input layer, the hidden layer, and the output layer, and when one or more input parameters are input from the input layer, the learning model outputs one or more output parameters corresponding to the input parameters from the output layer.

As an example of the input parameter, for example, in the case of controlling an air conditioner mounted on the vehicle 5 using the learning model, there may be various parameters that affect the temperature inside the vehicle, such as the outside air temperature, the location (latitude and longitude) where the vehicle 5 is used, the date and time, and the parking time (parking time before traveling) immediately before traveling. An example of an output parameter corresponding to such an input parameter is the set temperature of the air conditioner. As a result, the temperature inside the vehicle can be maintained at an appropriate temperature by controlling the air conditioner such that the temperature inside the vehicle becomes the set temperature acquired as the output parameter. As described above, when the air conditioner mounted on the vehicle 5 becomes the control device 2, various sensors necessary for acquiring the above-described input parameters and output parameters become the data acquisition device 3.

Further, as an example of the input parameter, for example, in the case of controlling an internal combustion engine mounted on the vehicle 5 using the learning model, current values of various parameters indicating the operating state of the internal combustion engine such as engine rotation speed, engine cooling water temperature, fuel injection amount, fuel injection timing, fuel pressure, intake air amount, intake air temperature, EGR rate, and boost pressure can be mentioned. Further, as an example of the output parameter corresponding to such an input parameter, estimated values of various parameters indicating the performance of the internal combustion engine such as $CO_2$ concentration and NOx concentration in the exhaust, concentration of other substances, and engine output torque can be mentioned. As a result, by inputting the current values of various parameters indicating the operating state of the internal combustion engine into the NN model as input parameters, the estimated values (current estimation values or future estimation values) of various parameters indicating the performance of the internal combustion engine can be acquired as output parameters. Therefore, for example, based on the output parameters, the internal combustion engine can be controlled such that the performance of the internal combustion engine approaches the desired performance. Further, when a sensor or the like for actually measuring an output parameter is provided, it is possible to determine a failure of the internal combustion engine, the sensor, or the like according to the difference between the measured value and the estimated value. As described above, when the internal combustion engine mounted on the vehicle 5 becomes the control device 2, various sensors necessary for acquiring the above-described input parameters and output parameters become the data acquisition device 3. In some embodiments, a camera mounted on the vehicle 5 may be controlled using a learning model. Regarding the learning model used for controlling the camera, input parameters may be images of landscape taken by the vehicle 5, and output parameters may be probabilities of the existence of human in the landscape. The learning model may be a NN model, more specifically, a CNN model.

Here, in order to improve the accuracy of the learning model, it is necessary to learn the learning model. For learning of the learning model, a large number of training data sets including the measured values of the input parameters and the measured values (correct answer data) of the output parameters corresponding to the measured values of the input parameters are used. Using a large number of training data sets, by repeatedly updating the values of the weight w and the bias b in the neural network by a known error back propagation method such that the difference between the output parameter value output from the learning model when the measured value of the input parameter is input and the measured value of the output parameter corresponding to the measured value of the input parameter is small, the values of the weight w and the bias b are learned, and thus the accuracy of the learning model is improved.

Therefore, the server 1 according to the present embodiment includes the data acquisition unit 21, the training data set creation unit 22, and the model learning unit 23, as illustrated in FIG. 1, in order to periodically learn the learning model and improve its accuracy.

The data acquisition unit 21 periodically acquires the data acquired by the data acquisition device 3 via the communication unit 10 and stores the data in the training data set creation database 31. The training data set creation unit 22 creates a large number of training data sets, including the measured value of the input parameter and the measured value (correct answer data) of the output parameter corresponding to the measured value of the input parameter, for each learning model used for each control device 2 based on the data stored in the training data set creation database 31. The model learning unit 23 learns (re-learns) each learning model using the training data set corresponding to each learning model.

In this way, in the present embodiment, a training data set is created based on the data acquired by the data acquisition device 3, and the learning model is regularly and automatically learned (re-learned) using the training data set.

However, even when learning (re-learning) of the learning model is performed, it is conceivable that the accuracy of the learning model does not increase, or even, the accuracy of the learning model decreases. For example, due to a failure or aged deterioration of the data acquisition device 3, the data acquired by the data acquisition device 3 may contain noise. When the learning model is learned using the training data set created based on data including such noise, the accuracy of the learning model may not be improved, or even, the accuracy of the learning model may decrease. When the re-learning is repeated regularly and automatically even though the accuracy of the learning model is not improved, limited arithmetic resources are wasted.

Therefore, the server 1 according to the present embodiment further includes the exclusion determination unit 24 in order to prevent the learning (re-learning) of the learning model from being unnecessarily carried out.

The exclusion determination unit 24 evaluates the accuracy of the relearned learning model using the data set for model evaluation prepared in advance, and then the exclusion determination unit 24 determines whether to temporarily exclude the learning model from the subsequent learning targets based on the evaluation result. In the present embodiment, when the accuracy of the learning model after learning is not improved or decreases as compared with that before learning, the exclusion determination unit 24 temporarily excludes the learning model from the subsequent learning targets. The method for evaluating the accuracy of the learning model is not particularly limited, and an appropriate evaluation method according to the type of the learning model can be selected from known evaluation methods.

Further, when it is determined that the learning model is temporarily excluded from the subsequent learning targets, the exclusion determination unit 24 requests the external organization to improve the accuracy of the learning model. The accuracy improvement request includes information on a learning model that is temporarily excluded from the learning targets, a training data set used for learning the learning model, and the data acquisition device 3 that acquired the data used for creating the training data set.

When an external organization receives a request to improve the accuracy of the learning model via the external organization terminal 4, a human expert analyzes the factors that resulted in the deterioration of the accuracy of the learning model and takes necessary measures to improve the accuracy.

For example, when the accuracy of the learning model deteriorates due to the inclusion of noise in the data that is the source of the training data set, the external organization applies pretreatment to the data to reduce noise, such as smoothing, centering, and background removal, that is, to increase the signal-noise ratio, and creates an appropriate new training data set. Then, the external organization learns the learning model using the newly created training data set to improve its accuracy. Then, the external organization transmits the learning model with improved accuracy in this way to the server 1 via the external organization terminal 4.

Figure 4:
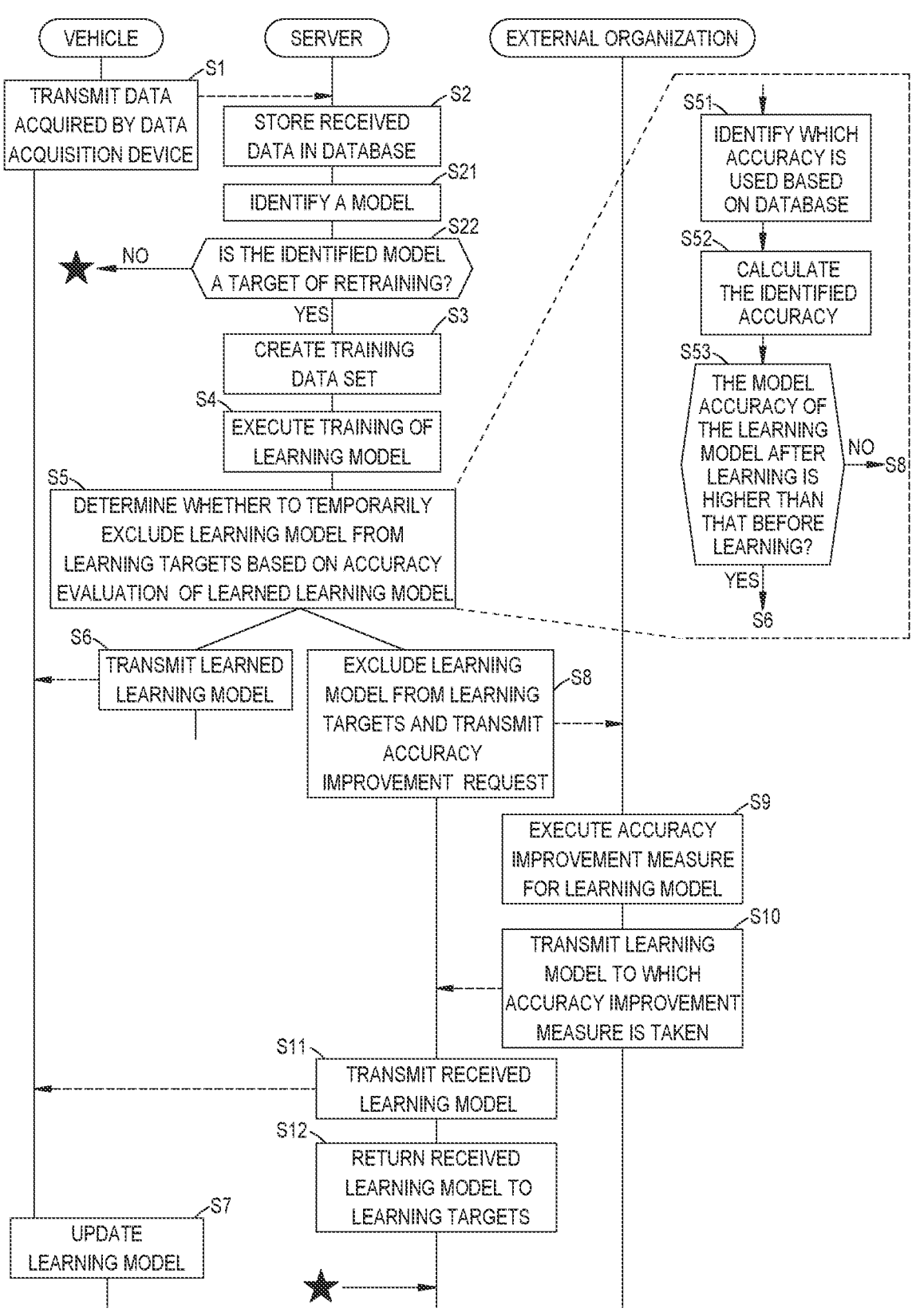
FIG. 4 is a diagram illustrating an example of an operation sequence of the model learning system.

FIG. 4 is a diagram illustrating an example of an operation sequence of the model learning system 100.

In step S1, the electronic control unit 50 of the vehicle 5 determines whether it is the data transmission timing for transmitting the data acquired by the data acquisition device 3 to the server 1, and when it is the data transmission timing, the data is transmitted to the server 1. As the data transmission timing, for example, the timing at which data is acquired by the data acquisition device 3 and the timing at which the amount of data acquired by the data acquisition device 3 and stored in the vehicle storage unit 52 exceeds a predetermined amount can be mentioned, but it is not particularly limited thereto.

In step S2, the server 1 that has received the data transmitted from the vehicle 5 stores the received data in the training data set creation database 31.

In step S21, the server 1 identifies a model based on the data transmitted from the vehicle 5.

In step S22, the server 1 identifies whether the identified model is a target of retraining based on the database 40. If the server 1 identifies that the identified model is a target of retraining, the server 1 proceeds to step S3. If the server 1 identifies that the identified model is not a target of retraining, the server 1 ends the process.

In step S3, the server 1 determines whether it is the timing for creating the training data set for each learning model used in the control device 2 of the vehicle 5, and then when it is the timing for creating the training data set, the server 1 creates a training data set corresponding to each learning model using the data stored in the training data set creation database 31. In this case, when there is a learning model excluded from the learning targets in step S8 described below, the server 1 determines that it is not the timing for creating the training data set for the learning model. On the other hand, for other learning models, that is, learning models excluded from the learning targets, the server 1 determines, for example, that it is the time for creating the training data set when the amount of data required for creating the training data set corresponding to the learning model becomes a predetermined amount or more.

In step S4, the server 1 automatically learns the learning model using the created training data set.

In step S5, the server 1 evaluates the model accuracy of the automatically learned learning model after learning, and determines whether to temporarily exclude the learning model from the target to be automatically learned based on the evaluation result. In the present embodiment, when the model accuracy after learning automatically the learning model decreases or does not increase compared to before learning, the server 1 excludes the learning model from the target to be automatically learned. The server 1 proceeds to step S6 when the model accuracy of the learning model after learning is higher than that before learning. On the other hand, the server proceeds to step S8 when the model accuracy after automatically learning the learning model decreases or does not increase as compared with that before learning.

Step S5 may include some detailed steps S51, S52, and S53. In step S51, the server 1 identifies which index of accuracy should be used to calculate the accuracy of corresponding learning model based on database 40. In step S52, the server 1 calculates the model accuracy of the learning model using the identified index of accuracy. In step S52, the server 1 identifies whether the model accuracy of the learning model after learning is higher than that before learning. The server 1 proceeds to step S6 when the model accuracy of the learning model after learning is higher than that before learning. On the other hand, the server 1 proceeds to step S8 when the model accuracy of the learning model after automatically learning the learning model decreases or does not increase as compared with that before learning.

In step S6, since the accuracy of the learning model after learning is higher than that before learning, the server 1 transmits the learning model after learning to the vehicle 5.

In step S7, when the electronic control unit 50 of the vehicle 5 receives the learning model from the server 1, the learning model used so far is updated with the received learning model.

In step S8, the server 1 transmits an accuracy improvement request to the external organization terminal 4. As described above, the accuracy improvement request includes information on a learning model that is temporarily excluded from the learning targets, a training data set used for learning the learning model, and the data acquisition device 3 that acquired the data used for creating the training data set.

In step S9, the external organization that receives the accuracy improvement request via the external organization terminal 4 analyzes the factors that resulted in the deterioration of the accuracy of the learning model and takes necessary measures to improve the accuracy by using a human expert.

In step S10, the external organization transmits the learning model having improved accuracy to the server 1 via the external organization terminal 4. In this case, for example, when the accuracy of the learning model deteriorates due to a failure or aged deterioration of the data acquisition device 3 that acquired the data that is the source of the training data set, the external organization may transmit a notification to the server 1 together with the learning model to encourage the replacement of the data acquisition device 3.

In step S11, the server 1 transmits the learning model received from the external organization to the vehicle 5. As a result, in step S7, the learning model previously used in the vehicle 5 is updated to the learning model having improved accuracy by the external organization. Further, when the server 1 has received the notification from the external organization for encouraging the replacement of the data acquisition device 3 or the like together with the learning model in step S10, the server 1 also transmits the notification to the vehicle 5. As a result, it is possible to encourage the vehicle 5 to replace the data acquisition device 3 at an early stage.

In step S12, the server 1 returns the learning model temporarily excluded from the learning targets to the learning targets.

The model learning system 100 according to the embodiment described above includes the control device 2 (device) on which the learning model is used, the data acquisition device 3 that acquires data for creating the training data set for the learning model, and the server 1 (model learning device) that automatically learns the learning model using the training data set for the learning model created using the data. The server 1 is configured to exclude the learning model from a target to be automatically learned when the model accuracy after learning automatically the learning model decreases or does not increase compared to before learning.

As a result, it is possible to prevent the re-learning from being automatically repeated even though the accuracy of the learning model is not improved. Therefore, it is possible to suppress wasteful consumption of arithmetic resources.

The server 1 (model learning device) according to the embodiment is configured to transmit a model accuracy improvement request for the learning model to the external organization terminal 4 belonging to the external organization when the learning model is excluded from the target to be automatically learned. The model accuracy improvement request includes information on the learning model excluded from the target to be automatically learned, the training data set used for learning the learning model, and the data acquisition device 3 that acquires the data used for creating the training data set. Specifically, the external organization is an external specialized organization that analyzes a factor that resulted in the deterioration of the accuracy of the learning model and improves the accuracy by using a human expert.

As a result, it is possible to identify the factor that resulted in the deterioration of the accuracy of the learning model and eliminate the factor. For example, when the accuracy of the learning model deteriorates due to a failure or aged deterioration of the data acquisition device 3 that acquired the data that is the source of the training data set, it is possible to encourage the replacement of the data acquisition device 3.

The learning model, which is excluded from the target, may be restored to the target when the external organization improves the accuracy of the learning model by using a human expert. The operation to restore the learning model to the target may be performed by the vehicle 5, the server 1 or the external organization. In some embodiments, after a predetermined period of time has elapsed, the learning model may be restored to the target automatically.

Although the embodiment of the present disclosure is described above, the embodiment described above shows only a part of the application example of the present disclosure, and does not intend to limit the technical scope of the present disclosure to the specific configuration of the embodiment described above.

In the embodiment described above, in step S10 of FIG. 4, the learning model having improved accuracy, for example, may be transmitted to the server 1, but it may be transmitted directly to the control device 2 in which the learning model is used or the vehicle 5 in which the control device 2 is mounted.

Further, in the embodiment described above, the learning model used for the control device 2 is installed in the control device 2, but is not limited to this, and the learning model itself may exist in the server 1 and the control device 2 may be controlled by using the learning model existing in the server 1.

What is claimed is:

1. A model learning system comprising:
a device in which a learning model is used;
a data acquisition device configured to acquire data used for creating a training data set for the learning model; and
a model learning device comprising:
a processor;
a database; and
a non-transitory memory storing instructions that cause the processor to:
automatically train the learning model using the training data set for the learning model created using the data,
in response to a model accuracy after automatically training the learning model decreases or does not increase compared to before training, exclude the learning model from a target to be automatically trained,
evaluate the model accuracy of the automatically trained learning model after training to generate a result, and
execute the exclusion of the learning model from the target to be automatically trained based on the result, wherein
the database is configured to store an index of accuracy that is configured to measure the model accuracy of the learning model, and information on whether the learning model is subject to retraining, wherein the processor is further caused to, in response to the learning model being excluded from the target to be automatically trained, transmit a model accuracy improvement request for the learning model to an external organiza-tion terminal belonging to an external organization, wherein the external organization is an external spe-cialized organization that analyzes a factor that results in a deterioration of accuracy of the learning model and improves the accuracy by using a human expert.

2. The model learning system according to claim 1, wherein the model accuracy improvement request includes information on the learning model excluded from the target to be automatically trained, the training data set used for training the learning model, and the data acquisition device that acquired the data used for creating the training data set.

3. The model learning system according to claim 1, wherein the model learning device comprises a server.

4. The model learning system according to claim 3, further comprising a vehicle that includes the device.

5. The model learning system according to claim 1, wherein the processor is caused to prevent re-training of the learning model from being automatically repeated.

6. A model learning device comprising:
a processor;
a database; and
a non-transitory memory storing instructions that cause the processor to:
automatically train a learning model using a training data set, in response to a model accuracy after automatically training the learning model decreases or does not increase compared to before training, exclude the learning model from a target to be automatically trained,
evaluating the model accuracy of the automatically trained learning model after training to generate a result, and
executing the exclusion of the learning model from the target to be automatically trained based on the result, wherein
the database is configured to store an index of accuracy that is configured to measure the model accuracy of the learning model, and information on whether the learning model is subject to retraining, wherein the processor is further caused to, in response to the learning model being excluded from the target to be automatically trained, transmit a model accuracy improvement request for the learning model to an external organization terminal belonging to an external organization, wherein the external organization is an external specialized organization that analyzes a factor that results in a deterioration of accuracy of the learning model and improves the accuracy by using a human expert.

* * * * *